United States Patent
Piana et al.

(10) Patent No.: US 12,298,119 B2
(45) Date of Patent: May 13, 2025

(54) METHOD FOR CHECKING A WALL THICKNESS OF A CONTAINER MADE OF AN AT LEAST PARTIALLY TRANSPARENT MATERIAL

(71) Applicant: KRONES AKTIENGESELLSCHAFT, Neutraubling (DE)

(72) Inventors: Stefan Piana, Koefering (DE); Andreas Stopfer, Regensburg (DE)

(73) Assignee: KRONES AKTIENGESELLSCHAFT, Neutraubling (DE)

(*) Notice: Subject to any disclaimer, the term of this patent is extended or adjusted under 35 U.S.C. 154(b) by 321 days.

(21) Appl. No.: 17/756,699

(22) PCT Filed: Oct. 14, 2020

(86) PCT No.: PCT/EP2020/078892
§ 371 (c)(1),
(2) Date: May 31, 2022

(87) PCT Pub. No.: WO2021/110308
PCT Pub. Date: Jun. 10, 2021

(65) Prior Publication Data
US 2023/0003508 A1    Jan. 5, 2023

(30) Foreign Application Priority Data
Dec. 2, 2019 (DE) ............... 10 2019 132 655.9

(51) Int. Cl.
*G01B 11/06* (2006.01)
*G01N 21/90* (2006.01)

(52) U.S. Cl.
CPC ......... *G01B 11/0691* (2013.01); *G01B 11/06* (2013.01); *G01N 21/9045* (2013.01); *G01N 21/9081* (2013.01)

(58) Field of Classification Search
CPC ............... G01N 21/90; G01N 21/9009; G01N 21/9018; G01N 21/9027; G01N 21/9036;
(Continued)

(56) References Cited

U.S. PATENT DOCUMENTS

| 3,328,593 A | * | 6/1967 | Johnson | ............ | G01N 21/9072 |
| | | | | | 356/388 |
| 3,439,178 A | * | 4/1969 | Rottmann | .......... | G01B 11/0691 |
| | | | | | 250/223 B |

(Continued)

FOREIGN PATENT DOCUMENTS

| CN | 1033479 A | 6/1986 |
| CN | 106017340 A | 10/2016 |

(Continued)

OTHER PUBLICATIONS

ISA European Patent Office, International Search Report Issued in Application No. PCT/EP2020/078892, Jan. 29, 2021, WIPO, 6 pages.

(Continued)

*Primary Examiner* — Gordon J Stock, Jr.
(74) *Attorney, Agent, or Firm* — McCoy Russell LLP (57) ABSTRACT

A method can include: irradiating a container with a measuring beam of an irradiation device at measurement points along a measurement direction, wherein a signal indicative of the wall thickness of the container at each measurement point is obtained by means of an optical detector, wherein by means of an evaluation device, the measurement points are compared with a reference curve that specifies the wall thickness of a reference container along the measurement (Continued)

direction, wherein if the comparison results in agreement between the measurement points and the reference curve it is determined that the wall thickness of the container corresponds to a predefined wall thickness and wherein if the comparison does not result in said agreement it is determined that the wall thickness of the container does not correspond to the predefined wall thickness.

17 Claims, 3 Drawing Sheets

(58) Field of Classification Search
CPC ........... G01N 21/9045; G01N 21/9081; G01N 21/958; G01N 2021/9063; G01B 11/02; G01B 11/022; G01B 11/024; G01B 11/06; G01B 11/0691
See application file for complete search history.

(56) References Cited

U.S. PATENT DOCUMENTS

| | | | | |
|---|---|---|---|---|
| 3,854,822 | A * | 12/1974 | Altman | G01B 11/2433 356/394 |
| 3,942,001 | A * | 3/1976 | O'Connor | G01N 21/90 62/51.1 |
| 3,980,890 | A * | 9/1976 | Heckrodt | G01N 21/90 250/559.08 |
| 4,066,363 | A * | 1/1978 | Juvinall | G01N 21/8851 356/428 |
| 4,304,995 | A * | 12/1981 | Huttunen | G01B 11/0691 250/341.1 |
| 4,393,305 | A * | 7/1983 | Shimizu | G01B 15/025 250/358.1 |
| 4,672,200 | A * | 6/1987 | Claypool | G01B 11/02 250/201.4 |
| 5,291,271 | A * | 3/1994 | Juvinall | G01B 11/06 356/632 |
| 6,806,459 | B1 * | 10/2004 | Ringlien | G01B 11/0691 209/524 |
| 6,863,860 | B1 * | 3/2005 | Birckbichler | G01N 21/9081 425/141 |
| 6,975,410 | B1 * | 12/2005 | Sturgill | G01B 11/06 356/631 |
| 7,060,999 | B2 * | 6/2006 | Juvinall | G01B 11/25 250/559.44 |
| 7,354,538 | B2 * | 4/2008 | Semersky | G01B 11/0691 425/141 |
| 7,385,174 | B2 * | 6/2008 | Ringlien | G01B 11/06 209/524 |
| 7,480,040 | B2 * | 1/2009 | Juvinall | G01B 11/24 356/239.7 |
| 9,036,023 | B2 * | 5/2015 | Holtkamp | G01J 5/08 382/141 |
| 9,671,357 | B2 * | 6/2017 | Holtkamp | G01J 5/025 |
| 2014/0029019 | A1 | 1/2014 | Leconte et al. | |
| 2022/0244039 | A1 * | 8/2022 | Leconte | G01N 33/386 |

FOREIGN PATENT DOCUMENTS

| | | | | |
|---|---|---|---|---|
| CN | 108871212 A | * | 11/2018 | ............ G01B 11/06 |
| DE | 3611536 A1 | | 10/1987 | |
| DE | 102005037101 A1 | | 2/2007 | |
| DE | 102007044530 A1 | | 4/2009 | |
| DE | 102011055735 A1 | | 5/2013 | |
| DE | 102017120201 A1 | | 3/2019 | |
| DE | 102017120612 A1 | | 3/2019 | |
| DE | 102017120863 A1 | | 3/2019 | |
| DE | 102018107368 A1 | | 10/2019 | |
| EP | 0871007 A1 | | 10/1998 | |
| EP | 0978710 A2 | | 2/2000 | |
| EP | 2676127 B1 | | 12/2014 | |
| WO | WO-2008011865 A1 | * | 1/2008 | ............ G01B 15/02 |
| WO | 2019081876 A1 | | 5/2019 | |

OTHER PUBLICATIONS

China National Intellectual Property Administration, Office Action and Search Report Issued in Application No. 202080083542.3, Dec. 31, 2024, 107 pages.

* cited by examiner

METHOD FOR CHECKING A WALL THICKNESS OF A CONTAINER MADE OF AN AT LEAST PARTIALLY TRANSPARENT MATERIAL

CROSS REFERENCE TO RELATED APPLICATIONS

The present application is a U.S. National Phase of International Application No. PCT/EP2020/078892 entitled "METHOD FOR CHECKING A WALL THICKNESS OF A CONTAINER MADE OF AN AT LEAST PARTIALLY TRANSPARENT MATERIAL," and filed on Oct. 14, 2020. International Application No. PCT/EP2020/078892 claims priority to German Patent Application No. 10 2019 132 655.9 filed on Dec. 2, 2019. The entire contents of each of the above-listed applications are hereby incorporated by reference for all purposes.

TECHNICAL FIELD

The present invention relates to a method for checking a wall thickness of a container made of an at least partially transparent material, for example a bottle made of PET, and to an inspection device for checking a wall thickness of a container.

BACKGROUND AND SUMMARY

From the prior art there are known methods for checking the wall thickness of containers after their manufacture, used for instance in the beverage processing industry or in the cosmetics industry.

Particularly relevant in this respect are methods for checking the wall thickness of containers manufactured in the stretch blowing method. That comes from the fact that the manufacturing of these containers from preforms can be subject to defects during manufacture, which can adversely affect the wall thickness of the container and hence the overall stability of the container as well. If such a container is further conveyed and subsequently filled, this can possibly lead to the breaking of the container, which would result in considerable contamination of the entire installation. Even if the container does not break, the defect in the wall thickness may cause deformation of the container during filling, making further conveying of the container impossible (for example, due to undesirable elongation of the container or the formation of bulges). This can also lead to impairments and even damage to the system.

In addition, such a defective container cannot be delivered to the customer since it does not meet the desired quality standards.

From the EP 2 676 127 there is known a method for the detection of defects of the material distribution in transparent containers, in which on the basis of an image of the light reflected by the outer wall on the outside as well as on the inside the material thickness is inferred and a corresponding value is compared with a reference value in order to determine whether the material thickness has the desired value.

This method can be advantageous for uniformly shaped containers.

Nevertheless, the difficulty arises that containers commonly used today have a relief pattern on their surface, which leads to different material thicknesses in different regions of the container. Consequently, containers oriented differently towards the inspection device will give different measurements for the wall thickness, even though outside or between the reliefs machined into the material they have the same wall thickness.

Any reliable statement as to whether such a container will then have the desired wall thickness at all is not possible.

Task

Proceeding from the known prior art, the technical task to be solved is therefore to provide a method for checking the wall thickness of a container that makes it possible to reliably determine the wall thickness even in the case of non-uniformly shaped containers.

Solution

According to the invention, this task is achieved by a method for checking the wall thickness of a container made of an at least partially transparent material and an inspection device for implementing the method.

The method according to the invention checking a wall thickness of a container made of an at least partially transparent material, for example a bottle made of PET, comprises irradiating the container with a measuring beam of an irradiation device at a plurality of measurement points along a measurement direction, wherein for each measurement point, a signal indicative of the wall thickness of the container at the measurement point is obtained by means of an optical detector, wherein by means of an evaluation device, the plurality of measurement points are compared with a reference curve that specifies the wall thickness of a reference container along the measurement direction, wherein if the comparison results in agreement between the plurality of measurement points and the reference curve it is determined that the wall thickness of the container corresponds to a predefined wall thickness and wherein if the comparison does not result in agreement between the plurality of measurement points and the reference curve it is determined that the wall thickness of the container does not correspond to a predefined wall thickness.

Here, it can be provided that the irradiation device is configured in accordance with known irradiation devices for checking the wall thickness of a transparent container and, for example, transmits light into the wall of the container, wherein this light is reflected from the outer surface and the inner surface and impinges on the optical detector. This detector may be configured as a camera or a similar device.

The reference curve is to be understood as such a curve which also contains a plurality of measuring points along the desired measurement direction or (using a reference container) has been determined from a plurality of such certain measuring points, for example by extrapolation and/or interpolation between the measuring points and possibly beyond the measurement points.

Preferably, the reference curve for the container will not only contain measurement points corresponding to a measurement of a container positioned once with respect to the irradiation device and the optical detector, but the reference curve will correspond to a measurement of a container that has also been positioned in different positions (in different orientations or rotations about its longitudinal axis, for example, with a measurement direction that is perpendicular to the longitudinal axis) with respect to the irradiation device. Thus, reference points on the reference curve are present even with a wide variety of relative arrangements of the container relative to the irradiation device, so that the corresponding reference curve can be used to make such a comparison regardless of the exact orientation of the container.

Consequently, for the measuring of the wall thickness, there can be used not only one measuring beam but also (simultaneously) several measuring beams along different measurement directions (optionally running parallel to each other).

Checking the wall thickness thus becomes independent of the actual orientation of the container relative to the irradiation device and the optical detector.

This method is therefore particularly advantageously applicable for containers provided with an outer contour, in the case of which the wall thickness of the containers changes along the measurement direction.

It can be provided that if the comparison does not result in an agreement of the plurality of measurement points with the reference curve, the evaluation device performs a transformation (translation, if necessary, also rotation) of the reference curve and a renewed comparison of the measurement points with the transformed reference curve is carried out, wherein if comparing the measurement points with the transformed reference curve results in an agreement, it is determined that the wall thickness of the container corresponds to the predefined wall thickness, and wherein if comparing the measurement points with the transformed reference curve does not result in an agreement, it is determined that the wall thickness of the container does not correspond to the predefined wall thickness.

In particular, the transformation can include displacement of a section of the reference curve until this section corresponds to the recorded region of the container with the irradiation device or the optical detector, and then carrying out a corresponding comparison. Whether the region of the reference curve after the transformation corresponds to the measurements recorded can again only be determined by means of a comparison, so that it can also be envisaged within this embodiment that a plurality of transformations of the reference curve are carried out until either an agreement is determined or it is determined that there is no agreement.

This embodiment is particularly advantageous for containers having surface structures that are not symmetrical with respect to a rotation of the container about the longitudinal axis, since a reliable checking of the wall thickness is yet still possible.

In one embodiment, provision is made for the irradiation device to radiate through and/or irradiate the container at each measurement point with at least one measurement beam.

In a further embodiment, the measuring beams can have different wavelengths per measuring point, with the wall thickness being determined by setting the at least two different wavelengths off against each other.

Since the wall thickness changes in containers provided with a surface structure, the transmission and reflection behavior of the material of the container with respect to certain wavelengths may also change in these regions. If at least two wavelengths are used in the irradiation, such changes, which could influence the measured wall thickness as a systematic error, can be compensated.

Furthermore, provision can be made for the measurement direction to run perpendicular to a longitudinal axis of the container or for the measurement direction to run parallel to a longitudinal axis of the container.

With this embodiment, relevant changes in the wall thickness of the container in the transverse direction and in the longitudinal direction can in principle be investigated, which in particular also enables simple measurement of the container, for example to generate a complete or almost complete wall thickness profile of the entire container.

In one embodiment, the transformation comprises displacement of the reference curve along the measurement direction by a value $\Delta$; wherein the value $\Delta$ is substantially less than 0.1D or less than 0.05D; wherein D is the extension of the container along the measurement direction.

The reference curve can be understood, for example, as a function that assigns a certain wall thickness $W(X)$ to a position X along the measurement direction. As already mentioned above, the corresponding function of the measured container is dependent on the actual orientation of the container relative to the irradiation device and/or the optical detector. If, when comparing the reference curve and the measurements, it is found that there is no agreement, such a slight modification of the argument X in the function $W(X)$ by replacing X with $X+\Delta$ can lead to a displacement in the reference curve, which is then compared with the measurements for the measured location X. This procedure can be carried out quickly in a computer, which usually forms the evaluation device, and requires little computing power, so that a plurality of these transformation steps can also be carried out for each container to determine whether the wall thickness of the container is in agreement with the reference curve. Therefore, a computationally simple procedure for the transformation of the reference curve and thus a still fast checking of the measurements is ensured, which makes this procedure also suitable for the on-going operation of container treatment machines with some 1000 up to some 10000 containers per hour.

In a further embodiment, the transformation is carried out as a function of a characteristic point of the plurality of measurement points and/or a measurement curve derived therefrom and/or as a function of a characteristic point of the reference curve.

Characteristic points are, for example, the points where there occurs a transition from a region of the container with a thin wall thickness to a region of the container with a thicker wall thickness, since here the thickness of the material is usually thicker than in all the usual regions. These are therefore expressed in the measurements and in the reference curve, for example as a maximum or minimum, and characterize the course of the entire curve (regardless of whether it is the reference curve or a curve generated from the measurement points). If the transformation is carried out in such a way that a characteristic point occurring in the measurement points is made to correspond to a characteristic point occurring in the reference curve (for example, as above, by transforming the argument X in the function $W(X)$ of the reference curve in such a way that the characteristic points of the reference curve and the measurement values coincide), then there is required only a single transformation in order to compensate for any alignment of the container with respect to the irradiation device or the optical detector and to enable a comparison with the reference curve in a useful way. If it is then determined that there is no correspondence between the measurements and the reference curve, it can be determined that the wall thickness does not meet the requirements.

This procedure reduces the number of transformation steps considerably, but may involve an increased computational effort, since an analysis of the measurements on the one hand and of the reference curve on the other hand with respect to characteristic points is necessary.

This increased computational effort can be reduced by the fact that the position of the characteristic points of the reference curve are already stored approximately in a memory (approximately together with the reference curve), so that only an analysis of the measurement points or of a curve extrapolated therefrom with regard to characteristic points has to be carried out and then a difference formation between the positions of these points in measurement direction takes place in order to carry out the transformation of the reference curve.

The procedure can be carried out for a container along different, optionally parallel, measurement directions. In this way there can be realized a very precise measurement of the container and in particular of its wall thickness.

Provision can also be made for comparing the measurement points with the reference curve and the transformed reference curve, taking into account a measurement tolerance of the measurement points and/or taking into account a tolerance of the reference curve and/or the transformed reference curve.

Since in particular the determination of the measurement points, but also the determination of the reference curve, for example from a reference container, is subject to certain errors, the consideration of these errors in the consideration of these errors in the context of tolerances can prevent the incorrect identification of wall thicknesses which are supposedly not in agreement or in agreement.

The method is preferably carried out by an inspection device comprising the irradiation device, the optical detector and the evaluation device, and the containers are supplied to the inspection device by means of a transport facility and are transported away from the transport facility, and wherein, in the event that no agreement of the measurement points with the reference curve and the transformed reference curve is determined, the operation of the transport facility is stopped. This can be used to ensure that any error that may occur, which is extreme in the change in the wall thickness of a container, is first identified and, if necessary, eliminated before the machine continues to operate. This can be in particular advantageous for machines arranged downstream, such as filling means for filling the containers, and can prevent damage or contamination.

In case there is not detected any agreement of the measurement points with the reference curve and the transformed reference curve, an information can be issued to an operator. For example, a warning can be issued to the operator that the measured wall thickness no longer corresponds to the predefined wall thickness. The operator can then independently decide, for instance, whether to continue the machine operation, or whether to stop it and, for instance, carry out repair or replacement of parts or a more detailed fault analysis.

Alternatively or additionally, a container can also be automatically diverted in the event that it is determined that the wall thickness is not in agreement with the specified wall thickness or corresponds thereto within the scope of the accuracy of the measurement. For the container diverting there can be used a pusher, which ejects the container from the transport facility and pushes it into a collecting container provided for this purpose. Other implementations for the diverting of the container from a neckhandling such as a star wheel or a clamp are also conceivable here.

Also alternatively or additionally, a preferably wirelessly transmitted message can be automatically sent to the operator or maintenance personnel in the event when it is determined that the wall thickness is not in agreement with the predefined wall thickness. Preferably, a message is sent to a tablet, cell phone or wearable whereas in particular machine data, target values and measurements are transmitted.

Particularly preferably, the measured wall thickness is assigned to the filling means so that it is known with which cavity, heating mandrel, heating zone, gripping element the container was processed or produced. Thus, in a closed loop process, in case of wall thicknesses in the (design) embossing area (relief, supporting structure, etc.) deviating from the target, an influence can be exerted on the filling means in order to return the distributions of material to the target wall thickness. On the one hand, this can be done automatically or support/guide the machine operator.

At least a part of the measurement points and/or the result of the comparison of the measurement points with the reference curve and/or the result of the comparison of the measurement points with the transformed reference curve can be stored in a memory associated with the evaluation device. This can be used, for example, to perform a subsequent error analysis by evaluating the data stored in the memory.

The inspection device according to the invention for checking a wall thickness of a container comprises an irradiation device, an optical detector and an evaluation device, wherein containers can be supplied to the inspection device via a transport facility and transported away from the inspection device by the transport facility, wherein the transport facility and the irradiation device and the optical detector are arranged relative to one another in such a way that a container conveyed in the transport facility can be irradiated by the irradiation device at at least a plurality of measurement points along a measurement direction and the optical detector can receive the light reflected and/or transmitted by the container from the measurement points along the measurement direction, wherein the inspection device is configured to carry out the method according to one of the previous embodiments. This inspection device is particularly advantageous for carrying out the method according to the invention.

The irradiation device can be configured to emit light with at least two different wavelengths and wherein the optical detector is configured to detect at least light of these two different wavelengths. Any errors due to a changing transmission and/or reflection behavior of the container wall for a specific wavelength when the wall thickness is changed can thus be compensated.

Furthermore, the irradiation device can be configured to irradiate a container with light for generating a plurality of measurement points along different measurement directions. This allows flexible use of the inspection devices not only for measuring an entire container, but also for measuring containers of different shapes.

In a further development of this embodiment, the irradiation device is configured to be slidable along at least one axis. The displacement of the irradiation device may consist of an actual physical displacement of the entire irradiation device, but it may also include, for example, a deflection of the emitted light, for example by mirrors or other optics, which is usually faster to perform than a complete displacement of the irradiation device. With this embodiment, not only the change of the measurement direction for a single container, but also the adaptation of the inspection device of different containers, for example by adapting the measurement direction to a changing shape or size of the container, can be realized.

DETAILED DESCRIPTION

Figure 1:
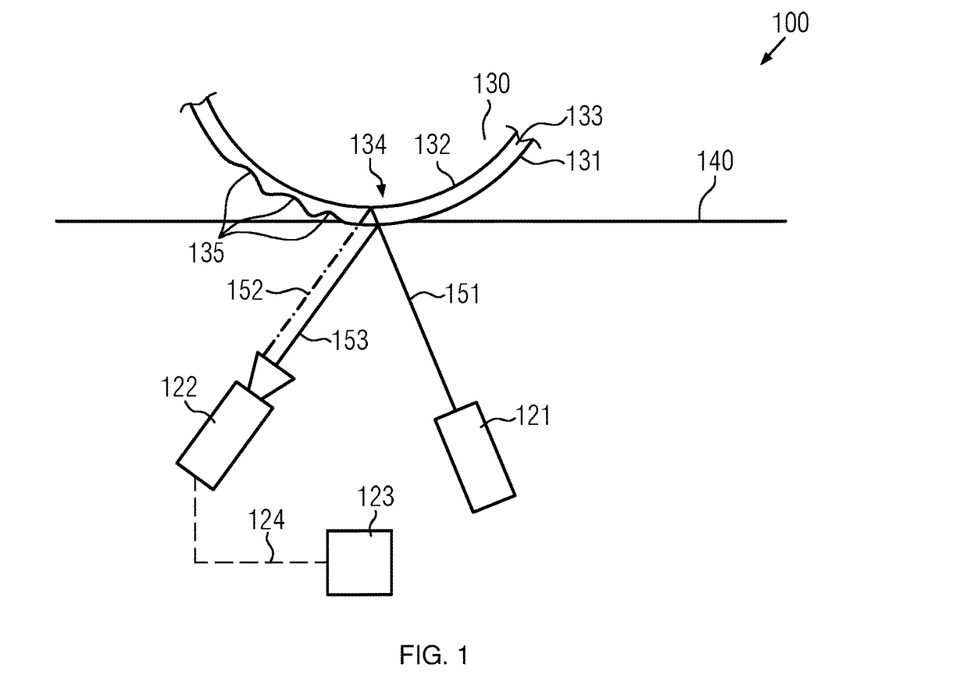
FIG. 1 shows a schematic representation of an inspection device 1 according to the invention.

FIG. 1 shows an inspection device 100 that can inspect containers according to the method of the invention. This inspection device includes or is associated with at least one transport facility 140 in which containers 130 can be conveyed. The transport facility can be, for example, a conveyor belt, but also any other known way of conveying containers. The containers are usually bottles or small cans, which are basically made of transparent material, in particular plastic, such as PET. For conveying these containers there have become common either support plates or turntables in conjunction with centering facilities that clamp the container between the centering facility and the plate, as well as claws that grip around the containers, for example in the area of a support ring or at least in the mouth region, so that the container is conveyed hanging.

Since it is essential for the invention that the material of the container can be irradiated in at least one region, there is preferred conveying in such a way that at least a large part of the wall of the container is exposed, so that grippers and centering devices with associated support plates or turntables can be in particular advantageous.

In this respect, the transport facility 140 is not limited.

For further explanation of the method according to the invention, however, it is essential that the container 130 (shown here in top view only as a cross-sectional section) has a wall 133. This wall, the wall of the container, has an outer surface 131 and an inner surface 132. Here, the inner surface 132 is the surface of the container facing the inner space of the container, which is usually filled with the medium to be filled into the container. The outer wall or outer surface of the container 131 is then the surface 131 of the wall 133 opposite the inner surface 132.

In the embodiment shown here, the wall 133 of the container includes regions of different thicknesses, such as the region 134 which extends relatively long along the circumference of the container and has a constant wall thickness, and the regions 135 which are formed, for example, as indentations in the surface of the container and in which the wall thickness of the container is smaller. Between these regions again extend regions with a greater wall thickness.

This is not absolutely necessary, but the method according to the invention is particularly advantageous for containers 130 which do not have a constant wall thickness, for example in relation to a cross-section of the container.

The inspection device 100 further comprises an irradiation device 121. For example, this may include one or more glow filaments to form a diffuse light source. The glow filament can be operated in such a way that it has an emission spectrum corresponding to its temperature, emitting electromagnetic radiation primarily in the infrared range. The glow filament can also be operated slightly red-glowing. It is also conceivable to operate the glow filament (or a filament) at a temperature at which it emits white light, i.e. its emission maximum is in the visible range. The light emitted by this one or a plurality of filaments then strikes the wall of the container. Alternatively, one or more diodes, in particular laser diodes, may be used to emit electromagnetic radiation (infrared light or visible light) 151 toward the wall of the container. Furthermore, an optical detector 122 is provided, for example in the form of a camera, which can detect light reflected from and/or transmitted through the container.

In the embodiment shown here, the detector 122 and irradiation device 121 are located on the same side of the container or transport facility, so that light reflected from the container is at least partially detected in the detector. In this case, light is not only reflected from the outer surface 131 of the container, but due to the transparency of the container, light is also reflected back from the inner surface and transmitted through the outer surface 131 towards the optical detector 122.

In a variant in which the detector records the light transmitted through the container, the detector 122 is arranged on the opposite side with respect to the transport facility 140 as the irradiation device 121. Thus, in the top view shown in FIG. 1, the transport facility is then located between the irradiation device 121 and the detector 122, so that a container to be inspected is also positioned between the irradiation device 121 and the detector 122.

Provision can be made that the irradiation device can selectively emit light of different wavelengths, such as light in the infrared spectral range, in the red spectral range, and/or light in the blue spectral range. By using light of different wavelengths, it is possible to compensate for random effects, such as constructive interference or destructive interference of the portions of the light emitted by the irradiation device that are reflected and/or transmitted from the inside and from the outside of the container, which could unintentionally influence the measurement result of the wall thickness. Alternatively, it can also be provided that the irradiation device emits white light (or only infrared light or red light and infrared light), as has been described for the glow filament, for example, and the optical detector has a plurality (at least 2) color filters or corresponding color filters are arranged between the irradiation device configured in this way and the container. These can be filters, for example, one of which allows only blue light through and one of which allows only red light through. The effect of avoiding undesirable effects described above can also be achieved with this.

Regardless of whether the light beams 152 (reflected from the inner surface 132) and 153 (reflected from the outer surface 131) are transmitted or reflected by the bottles, they then strike the optical detector 122. Usually, due to the material thickness or wall thickness of the container, the amount of transmitted (reflected) light and thus the optical signal arriving at the optical detector (depending on the wall thickness) is stronger or smaller. The optical detector 122 may then transmit a signal (for example, a brightness signal or an interference signal or the like) correspondingly indicative of the wall thickness of the container to an evaluation device 123. For this purpose, this evaluation device can be connected to the optical detector, for example via a cable connection 124, but also via a wireless connection or in any suitable way for transferring data at least from the optical detector to the evaluation device, but preferably bidirectionally.

A reference curve is stored in or can be retrieved from the evaluation device 123, as will also be described in more detail with reference to FIGS. 3 and 4. This reference curve corresponds to expected signals indicative of the wall thickness of the container at specific locations on the container in the measurement direction and may, for example, have been generated by measuring a reference container whose wall thickness is known. Alternatively or additionally, of course, a measurement of a large number of reference containers can be carried out for this purpose, in order to obtain from these a reference curve that avoids errors as systematically as possible. A simulated ideal container can also serve as the basis for the reference curve.

However, how the reference curve was ultimately determined is not relevant to the method according to the invention. Preferably, the reference curve extends over a region larger than the region typically measured for a single container. If, for example, the container is moved past the irradiation device 121 in an upright position and is not rotated relative to the irradiation device, a measurement of the wall thickness only takes place in the partial region of the surface of the container facing the irradiation device. However, the reference curve available to the evaluation device 123 preferably includes values for the wall thickness or values indicative of the wall thickness of the container that cover the entire surface of the container.

In this regard, it should be mentioned that the irradiation device irradiates the container along a measurement direction (such as along the cross-sectional direction of the container shown here in FIG. 1) to generate a plurality of measurement points. A reference curve is then preferably stored in the evaluation device for precisely this measurement direction. This is described in more detail in FIG. 5. Irradiation can be done either by moving the container past the irradiation device and irradiating the container point by point. However, it can also be provided that the container is positioned in such a way that the light from the irradiation device impinges on exactly one point of the container (for example, if a turntable is used together with a centering device). The container is then rotated (either by a portion of its entire circumference or by a full rotation), generating a corresponding signal in the detector for various measurement points along the measurement direction.

The first method has the advantage that the machine can be operated continuously. However, it provides only limited useful results, especially in the regions of the container that curve strongly toward or away from the illumination unit due to its cross-sectional shape. The second method allows the wall thickness to be recorded with high accuracy, but requires the inspection device to be operated in cycles.

By comparing the reference curve with the measurements recorded along the measurement direction, which are indicative of the wall thickness of the container, it is then possible to determine whether the wall thickness of the container corresponds to the expected values for the wall thickness. This can be done, for example, by detecting an agreement of the reference curve or part of the reference curve (if it covers a larger area of the surface of the container than is checked during the inspection with the inspection device). This agreement can, of course, take into account any error tolerances. Therefore, it can be taken into account that the resolution and the determination of the signals in the optical detector is possible only with a certain accuracy. Moreover, it can be taken into account that the production of the container itself is subject to certain tolerances, so that, for example, slight deviations of the wall thickness from the reference value are still acceptable. Therefore, establishing agreement between the reference curve and the measurements is essentially to be understood as establishing agreement within the intended tolerances.

Figure 2:
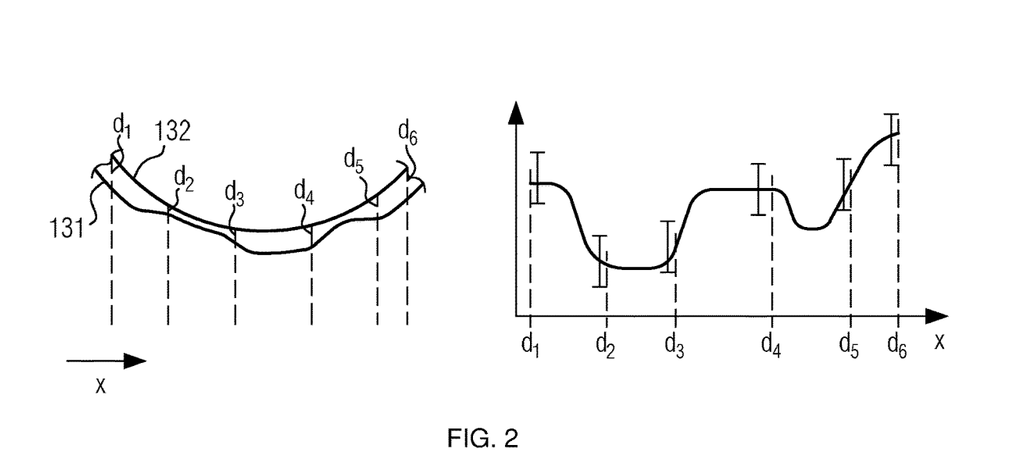
FIG. 2 shows the course of the wall thickness of a container and the resulting measurement points.

For a more detailed illustration of the measurement process using the inspection device 100, FIG. 2 describes an example container and the resulting measurements.

The container section shown here, which may for example have been taken at a certain height of the container, represents a part of the cross-section of the container and the longitudinal axis of the container is preferably perpendicular to this cross-section.

The section of the surface of the container shown here does not have a constant wall thickness. In one region, the wall thickness (also due to the curvature of the surface of the container) is considerably greater with d1 than, for example, in the d2 region. The region with a thin wall thickness slowly becomes thicker at about area d3 until it has thickness d4 in this region. Subsequently, the wall thickness decreases again, wherein again due to the curvature of the container, the determinable wall thickness d5 is greater and increases up to the wall thickness d6 (again due to the curvature of the container).

In this context, it should be noted that due to the irradiation with the irradiation device 121 and the reception of the signal in the optical detector 122 and due to the usually present curvature of the container (these usually have a round or at least curved cross-section), a "wall thickness" is ultimately determined, which is also influenced by the curvature of the container. As shown in FIG. 2 on the left, the wall thickness d1 does not extend approximately perpendicular to surfaces 131 and 132, but is indicated at an angle to them so that it is greater than the actual wall thickness. This is due to the fact that the light from the irradiation device usually does not hit the surface of the container perpendicularly, but hits it at an angle that can also change depending on the curvature of the container. Highly curved regions, i.e. in particular the regions shown on the left and right in the left part of FIG. 2, which curve strongly towards or away from the illumination unit, usually provide an unreliable result, since the light passes through more material here than would be the case due to the actual wall thickness when the light falls perpendicularly on the surface of the container. These regions can be omitted, for example, when the measurements are later compared with the reference curve. The picture shown in FIG. 2, however, assumes that the container is simply moving past the illumination unit. As described above, it may also be provided that the container is positioned in the region of the illumination device so that only one point of the container is irradiated (such as preferably so that the incidence of light is perpendicular to the surface). Meanwhile, the container is rotated so that measurement points indicative of the wall thickness of the container can be recorded over at least a portion of the circumference of the container (in some embodiments, around the entire circumference of the container).

Notwithstanding the foregoing, in the figure shown on the right of FIG. 2, the corresponding image for the signals recorded by the optical detector 122 is at least indicative of (though not synonymous with) the wall thickness of the container. The region d1 shows the relatively thick measured wall thickness, whereas the regions d2 and d3 can be seen in the thinner region of the container. The wall thickness d4 is measured in the again thicker area and the wall thicknesses d5 and d6 increase despite the actual wall thickness remaining constant due to the curvature of the container and its relative orientation to the irradiation facility.

So while the signals measured here are very much indicative, at least in part, of the wall thickness of the container, they are not identical to the wall thickness, since other influences such as the curvature of the container, discussed earlier, also have here an impact.

Nevertheless, the measurement curve shown on the right in FIG. 2 can be used to draw conclusions about the actual wall thickness of the container.

For this purpose, the reference curve available in the evaluation device 123 can be used, which, as already described, preferably represents more than just a section of the surface of the container in the measurement direction.

Figure 3:
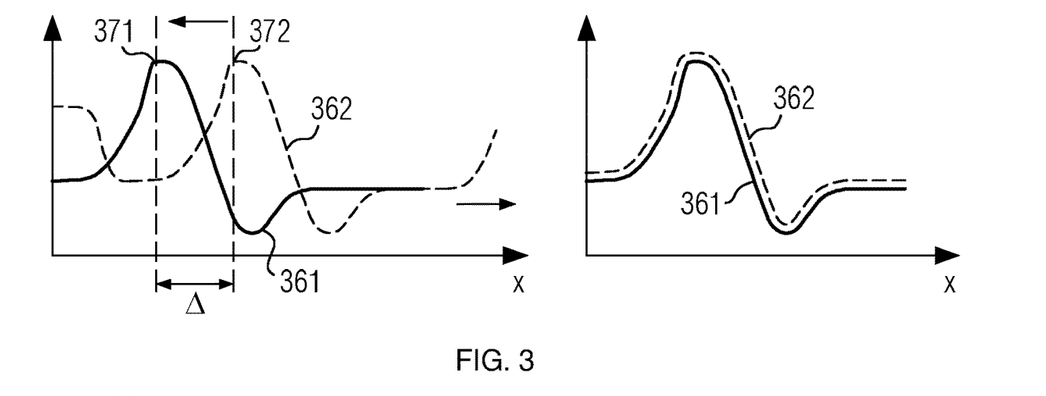
FIG. 3 shows an embodiment of a transformation of a reference curve for checking the wall thickness of a container.

This is described in FIG. 3.

FIG. 3 shows the "measurement curve" 361 resulting from a plurality of measurement points along a measurement direction. This can be understood as an interpolation between a number of measurement points along the measurement direction. So instead of this continuous curve, a series of measurement points could also be displayed.

It is understood that the curve 361 shown here will also have some error corresponding to the actual measurement points recorded. This could additionally be supplemented here by error bars, as shown in FIG. 2, to provide an indication of the accuracy of the curve. However, this has not been done here for the sake of clarity.

In addition to the measurement curve of the real container resulting from the measurements along the measurement direction, the reference curve 362 is shown. This is obviously different from the resulting measurement curve 361 in the figure shown at left in FIG. 3. Thus, it not only includes a maximum and a minimum, but also includes another maximum to the left of the pronounced maximum, separated from the pronounced maximum by another minimum. With larger argument X the reference curve 362 grows again.

At first observation, the skilled person will conclude that the reference curve 362 and the curve 361 resulting from the measurement points are not in agreement. However, as mentioned above, the obtained measurements of the method for checking the wall thickness according to the invention differ from each other depending on how the container is oriented relative to the irradiation device and/or the optical detector of FIG. 1.

As an illustrative example of this, it can be imagined that to generate the reference curve, the surface of the container is unrolled so that the entire circumference of the container is shown as a straight line. The corresponding wall thicknesses can be plotted as a reference curve over the entire circumference of the container. The beginning of the rolling of the surface of the container can be arbitrarily set to the value 0 as the location X0. However, the actual orientation of a container to be measured relative to the irradiation device and relative to the optical detector of FIG. 1, and thus the location X1 of the real container to be measured, is usually not known and may vary. Thus, the beginning of the measurement does not have to at all be in agreement with the location X0 as the beginning of the rolling of the surface of the container for the imaginary generation of the reference curve, but it can be located, for example, at the location X1, which differs from the location X0 by the value Δ. While the measured container or the wall thicknesses obtained for this container are identical to the reference curve in the corresponding region, there is a displacement between the measured and the reference curve by exactly the amount Δ.

This can be seen in the left-hand illustration of FIG. 3, where the two maxima of the measurements are separated by the distance Δ.

In one embodiment of the method according to the invention, it can now be provided that the reference curve is transformed when making the comparison between the measurements with the reference curve, if in a first comparison step no agreement is obtained between the reference curve (without transformation) and the measurements. This transformation may be, for example, a displacement of the reference curve 362 with respect to the curve 361. In accordance with the invention, there are now two possibilities here, each of which presents certain advantages.

On the one hand, a transformation of the reference curve can be performed by displacement of the reference curve by a fixed amount Δ, wherein the amount Δ is preferably significantly smaller or substantially smaller than the extension of the container or the reference container along the measurement direction. If the measurement direction is parallel to the circumferential direction of the container, the extension of the container is the circumference. If the extension of the container along the measurement direction is denoted by D, then preferably Δ can be less than 0.1D and more preferably less than 0.05D, especially preferably less than 0.005D.

This displacement of the reference curve by an absolute amount is computationally simple to implement and thus requires little processor power. However, such a displacement in a first step may not immediately result in an agreement between the reference curve and the measurements, although objectively this may very well be the case. This may be because the difference between the values X1 and X0 is larger than the fixed Δ, so that, for example, several transformation steps (2, 3, 4, 5, etc.) may be necessary until the present agreement is established. Therefore, in extreme cases, this may require that a displacement by a length corresponding to the extension of the container in the measurement direction be reduced by the length of the section of the container actually measured in the measurement direction be run in individual partial steps Δ until a final conclusion is reached about the present agreement or non-agreement of the measured points with the reference curve. This can be time-consuming and require considerable effort for a single transformation, despite the actually small amount of computer resources required.

Alternatively, the displacement Δ, by which the reference curve must be shifted in order to be brought into line with the measurements, if necessary, can also be calculated first before the displacement or transformation is carried out.

This process is shown in FIG. 3. As can be seen in the left figure of FIG. 3, both the reference curve and the curve resulting from the measurements 362 and 361 (or the plurality of measurement points) have a pronounced maximum at points 371 (for the measurement curve) and 372 (for the reference curve). It may be known that the container on which FIG. 3 is based must always have such a pronounced maximum because, for example, it has a material thickening and thus wall thickness in a certain region that is not achieved in any other region. The position of this point, if included in the measurement curve, therefore clearly defines the distance Δ between points X0 and X1 (see above). Therefore, if the measurement curve contains this characteristic point (the maximum 371), its relative position with respect to the maximum 372 of the reference trace 362 can be used to determine the necessary displacement Δ for the transformation of the reference curve. Then the reference curve can be transformed with the resulting Δ and the picture shown on the right in FIG. 3 is obtained. After the transformation, the reference curve and the measurement curve coincide and it is shown that the measurement curve, comprising or formed from the individual measurements along the measurement direction, corresponds to the reference curve, i.e. the wall thickness is as expected.

Of course, this method is only applicable if the section of the container that was measured in FIG. 1, for example (if it is not the entire circumference of the container), also contains the characteristic point in question. If this is not the case (which can be determined, for example, in the course of an initial analysis of the measurements), the method described before can be used by transforming the reference curve by a certain, fixed value Δ in order to nevertheless enable a comparison of the measurements with the reference curve.

Provision can be made that the characteristic point 372 or a plurality of characteristic points along the reference curve (for example, a series of maxima or minima) are stored in a memory associated with the evaluation device, and each of these characteristic points may be compared with the reference curve to determine which of these characteristic points is to be found approximately on the reference curve in order to determine the necessary displacement Δ of the reference curve.

If the container is measured in the inspection device along its entire circumference (for example, when using a turntable), the described method of determining the characteristic points and deriving the displacement Δ is always applicable, since all characteristic points that may be present are also recorded during the measurement.

If no characteristic point is detected, it can also be determined directly by the evaluation device that the course of the wall thickness does not correspond to the course of the reference curve, or in general the wall thickness does not correspond to the expectations.

Figure 4:
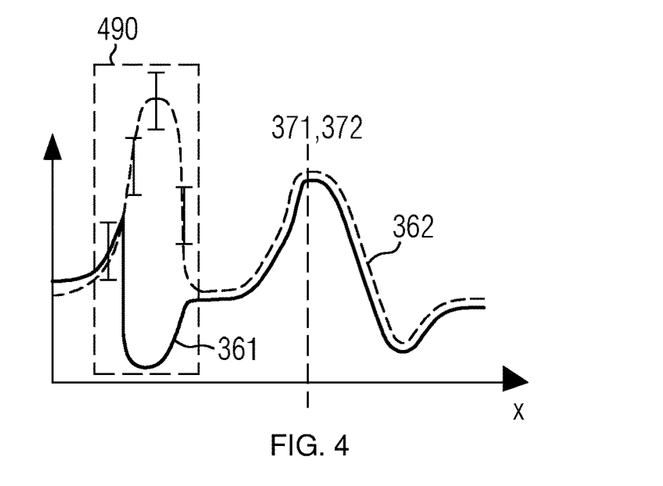
FIG. 4 shows a variant in which the reference curve and the measurement points are not in agreement to each other.

FIG. 4 shows a case where even a transformation of the reference curve does not provide an agreement between the measurement curve or the measurements and the reference curve.

FIG. 4 again shows the measurement curve 361 of a measured container and the reference curve 362. Both have a maximum 371 and 372, respectively. This was used, where appropriate, to bring the reference curve into agreement with the measurements or measurement curve 361. Thus, although the relative orientation of the measurement curve and the reference curve in FIG. 4 has been determined on the basis of the maxima and a corresponding transformation has been performed, it can be seen in the region 490 that the measurement curve 361 differs from the reference curve 362 even taking into account the error bars shown in this region, i.e., agreement does not exist in any case.

Accordingly, in this embodiment, the comparison between the reference curve and the measurement curve or measurements leads to the determination that they are not in agreement, even within the error tolerance, regardless of any transformation made to the relative arrangement of the reference curve and the measurement curve.

Figure 5:
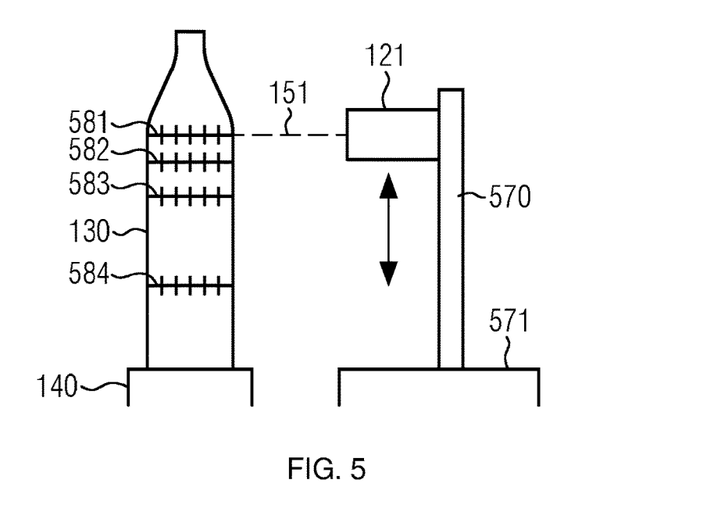
FIG. 5 shows an embodiment of a vertically adjustable irradiation device.

FIG. 5 shows an embodiment of the invention in which the containers are measured along different measurement directions.

In FIG. 5, the container 130 is shown on the transport facility (shown here as a support plate or a turntable 140). In this embodiment, the irradiation device 121 is movably supported along the axis 570, which may be one disposed on a module housing 571 of the inspection device, so that the irradiation device 121 can be moved up and down along the double arrow shown. In this embodiment, the irradiation device can thus emit the light 151 at different heights (along the longitudinal axis of the container).

A plurality of measured values can then be determined along the measurement directions 581, 582, 583, and 584, respectively, by correspondingly moving the irradiation device 121. Thereby, in the embodiment shown here, a plurality of measurement points along the three different measurement directions 581 to 583 have been recorded in the neck region or shoulder region of the container, in which the container can usually have a strong curvature of the surface and also, if necessary, relief structures.

An additional measurement in the body region of the container along the measurement direction 584 may be provided. More or less than the four different measurement directions described here can also be used. Thus, a measurement direction can also be perpendicular to the measurement direction shown here or include a certain angle different from 90° and from 0° with them.

While in FIG. 5 only the irradiation device 121 is moved vertically, it may also be provided that the optical detector is moved accordingly to ensure that the light reflected from the container at different heights is actually detected by the optical detector.

As an alternative to moving the optical detector and/or the irradiation device as a whole, it may also be provided that only an optical system, such as an array of mirrors or lenses, is moved in order to implement the different measurement of the container along the differently depicted measurement directions 581 to 584. In this way, the number of components to be moved and, in particular, the amplitude of movement can be kept as low as possible.

Furthermore, it can also be provided that (separate) irradiation devices are arranged at different heights relative to the transport facility (and thus relative to a container conveyed therein) or that the irradiation device extends over a corresponding vertical extension. Accordingly, one or more detectors are then provided that can detect the light transmitted or reflected through the container at the appropriate heights.

Figure 6:
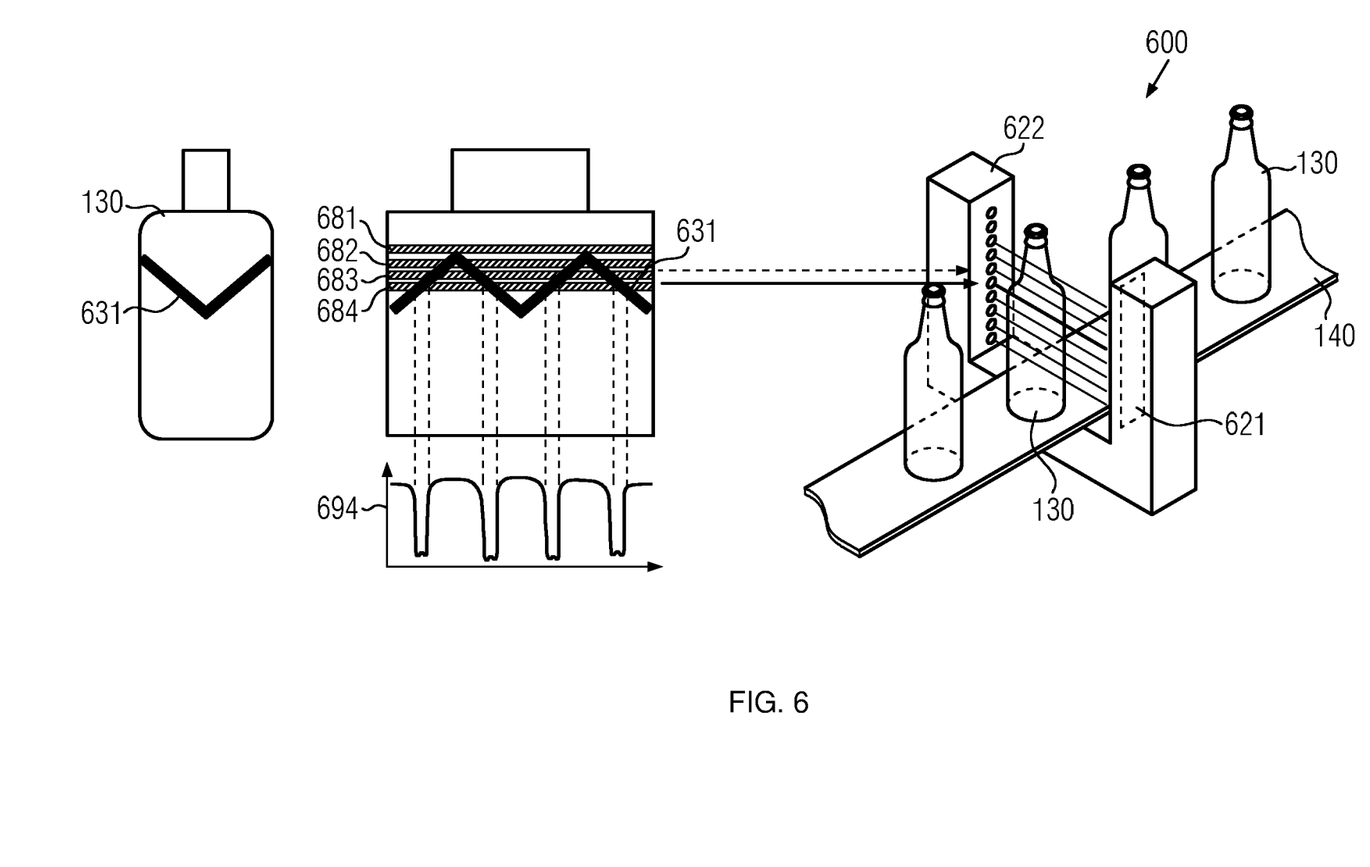
FIG. 6 shows a further embodiment of an inspection device.

In FIG. 6 there is shown a corresponding embodiment.

In the embodiment shown in FIG. 6, a container 130 is shown on the far left of the image, which has a varying wall thickness 631, for example due to an embossed or impressed pattern. On the left of FIG. 6, the container is shown from one side only, and it is shown "unrolled" in the center of the FIG. 6 illustration, that is, its entire surface is shown by unrolling the bottle onto a plane. The change in material thickness 631 is also shown here. In connection with the middle picture, there is also shown the course of the wall thickness along the entire circumference of the container.

To the right of FIG. 6 there is shown an embodiment of the inspection device 600, and here, too, the transport facility 140 and the containers 130 may be arranged in accordance with the variants described, for example, in FIG. 1.

However, here the detector 622 and the irradiation device 621 are arranged on opposite sides of the transport facility, so that the container is thus completely radiated through by the light emitted by the irradiation device and subsequently the light thus transmitted through the container is received.

This corresponds to the variants already described in FIG. 1, alternatively to the recorded images of the reflected light.

FIG. 6 also shows the wall thickness measured in at different heights or measurement directions 681 to 684 in, with the measurement curve 694 shown for the measurement direction 684 along the entire circumference of the container.

The measurement curve actually recorded by the detector 622 may represent only a portion of this reference curve 694.

In accordance with the procedures described in the previous figures, the reference curve can then be displaced relative to the measurement curve to determine whether there is an agreement.

In this respect the procedure is analogous to the procedure described in FIGS. 3 and 4 for determining an agreement or determining that a final agreement between the reference curve and the measurement curve cannot be achieved even by transformation.

In the embodiments described in FIGS. 3 to 6, reference has basically been made to reference curves for wall thickness which have mapped the entire surface of the container, giving a function w(φ) for wall thickness dependent on only one parameter, where φ can be approximately the angle of rotation of the container about its longitudinal axis with respect to any initial position.

In FIGS. 5 and 6, by (simultaneously) recording different measurement curves (i.e., in different vertical positions along the circumference of the container), two-dimensional information about the behavior of the wall thickness in the circumferential direction and in the longitudinal direction of the container can also be obtained. While the reference traces discussed so far are simply a function w(φ) indicating the wall thickness w as a function of the position φ along the measurement direction, this information can also be arranged as a function dependent on two parameters. For example, to the points on the surface there can be assigned a wall thickness depending on their vertical position (in the longitudinal direction of the container) and depending on their position along the circumference of the container, so that the wall thickness function w(1, φ) depends on two variables, one being the angle of rotation φ with respect to any initial position or zero position of the container and the vertical position 1 along the longitudinal direction of the container.

Such a function can also be stored for the entire surface of the container and used according to the above procedures to check an agreement between the measurement curve (which can then also be two-dimensional but does not have to be) and the reference curve.

While it has always been assumed here that a corresponding reference curve is then also available for the entire available parameter range (for example, for the entire angle of rotation (p, i.e. along the entire circumference), this is not absolutely necessary.

Since the inspection device may typically be located downstream of a container cleaning machine and/or a blow molding machine or similar machine for producing the containers, it may result that the containers are always supplied to the inspection device in substantially the same orientation with respect to any normal orientation. For example, a normal orientation of the containers may be specified as the "mean" value of all containers output from the container cleaning machine and/or a blow molding machine, with the actual orientation of the containers varying about this mean value by +/−10 degrees, +/−20 degrees, or any value in between, or any larger or any smaller values.

For example, containers produced by a blow molding machine can always be output from this machine in the same orientation and supplied to the inspection device. If they are not rotated further approximately around their longitudinal axis during conveying from the blow molding machine to the inspection device, the orientation of all containers is essentially the same as when they left the blow molding machine and this is practically the same for all containers.

If this variation is known with sufficient accuracy and is reliably observed by all containers, it is no longer necessary to provide a reference curve that maps the entire surface of the container and assigns a wall thickness value to a point on the surface of the container (at least along one or more measurement directions). It may then be sufficient to store a corresponding section of the container around this normal orientation as a reference curve and use it for comparison with the measurement curves of the individual containers.

Alternatively, it is also possible to relate a reference curve (expectation area) to the measurement result by means of a second known feature. In the case of a plastic container, this can be the container seam or the pentaloid base, which are in a fixed angular relationship to design elements.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for checking a wall thickness of a container made of an at least partially transparent material, the method comprising: irradiating the container with a measuring beam of an irradiation device at a plurality of measurement points along a measurement direction, wherein the irradiation device transmits electromagnetic radiation into a wall of the container, wherein for each measurement point, a signal indicative of a wall thickness of the container at the measurement point is obtained by means of an optical detector, wherein by means of an evaluation device, the plurality of measurement points are compared with a reference curve that specifies a wall thickness of a reference container along the measurement direction, wherein if the comparison results in agreement between the plurality of measurement points and the reference curve it is determined that the wall thickness of the container corresponds to a predefined wall thickness and wherein if the comparison does not result in agreement between the plurality of measurement points and the reference curve it is determined that the wall thickness of the container does not correspond to the predefined wall thickness.

2. The method according to claim 1, wherein the container, by the irradiation device, is radiated through and/or irradiated by two measuring beams at each measurement point and the two measuring beams have different wavelengths.

3. The method according to claim 1, wherein the measurement direction runs perpendicular to a longitudinal axis of the container; or wherein the measurement direction runs parallel to the longitudinal axis of the container.

4. The method according to claim 1, wherein the method is carried out for the container along different measurement directions.

5. The method according to claim 1, wherein the container is a bottle made of PET.

6. The method according to claim 4, wherein the measurement directions run parallel to one another.

7. The method according to claim 1, wherein when the comparison does not result in an agreement of the plurality of measurement points with the reference curve, the evaluation device performs a transformation of the reference curve and a renewed comparison of the measurement points with the transformed reference curve is carried out, wherein if comparing the measurement points with the transformed reference curve results in an agreement, it is determined that the wall thickness of the container corresponds to the predefined wall thickness, and wherein if comparing the measurement points with the transformed reference curve does not result in an agreement, it is determined that the wall thickness of the container does not correspond to the predefined wall thickness.

8. The method according to claim 7, wherein the transformation comprises a displacement of the reference curve along the measurement direction by a value Δ; wherein the value Δ is substantially less than 0.1D or less than 0.05D; wherein D is an extension of the container along the measurement direction.

9. The method according to claim 7, wherein the transformation is carried out as a function of a characteristic point of the plurality of measurement points and/or a measurement curve derived therefrom and/or as a function of a characteristic point of the reference curve.

10. The method according to claim 7, wherein comparing the measurement points with the reference curve and the transformed reference curve is performed taking into account a measurement tolerance of the measurement points and/or taking into account a tolerance of the reference curve and the transformed reference curve.

11. The method according to claim 7, wherein the method is carried out by an inspection device comprising the irradiation device, the optical detector and the evaluation device, and the container is supplied to the inspection device by means of a transport facility and are transported away from the inspection device by the transport facility, and wherein, if no agreement of the measurement points with the reference curve and the transformed reference curve is determined, operation of the transport facility is stopped.

12. The method according to claim 11, wherein, if no agreement of the measurement points with the reference curve and the transformed reference curve is determined, information is output to an operator and/or wherein, if no agreement of the measurement points with the reference curve and the transformed reference curve is determined, the container is channeled out of the transport facility.

13. The method according to claim 7, wherein at least a part of the measurement points and/or the result of the comparison of the measurement points with the reference curve and/or the result of the comparison of the measurement points with the transformed reference curve is stored in a memory associated with the evaluation device.

14. An inspection device for checking a wall thickness of a container, wherein the inspection device is configured to carry out the method according to claim 1, wherein the inspection device comprises the irradiation device, the optical detector and the evaluation device, wherein the irradiation device is adapted to transmit electromagnetic radiation into a wall of the container, wherein the container can be supplied to the inspection device via a transport facility and transported away from the inspection device by the transport facility, and wherein the transport facility and the irradiation device and the optical detector are arranged relative to one another in such a way that a container conveyed in the transport facility can be irradiated by the irradiation device at at least a plurality of measurement points along a measurement direction and the optical detector can receive light reflected and/or transmitted by the container from the measurement points along the measurement direction.

15. The inspection device according to claim 14, wherein the irradiation device is configured to emit light with at least two different wavelengths or broadband; and
    wherein the optical detector is configured to detect at least light of two different wavelengths.

16. The inspection device according to claim 14, wherein the irradiation device is configured to irradiate the container with light for generating the plurality of measurement points along different measurement directions.

17. The inspection device according to claim 16, wherein the irradiation device is configured to be slidable along at least one axis.

* * * * *